(12) United States Patent
Weng et al.

(10) Patent No.: US 9,438,564 B1
(45) Date of Patent: Sep. 6, 2016

(54) MANAGING POOLED VPN PROXY SERVERS BY A CENTRAL SERVER

(71) Applicant: Google Inc., Mountain View, CA (US)

(72) Inventors: Zhi Weng, San Jose, CA (US); Lantian Zheng, San Jose, CA (US)

(73) Assignee: Google Inc., Mountain View, CA (US)

( * ) Notice: Subject to any disclaimer, the term of this patent is extended or adjusted under 35 U.S.C. 154(b) by 770 days.

(21) Appl. No.: 13/622,187

(22) Filed: Sep. 18, 2012

(51) Int. Cl.
*H04L 29/06* (2006.01)

(52) U.S. Cl.
CPC ....... *H04L 63/0272* (2013.01); *H04L 63/0281* (2013.01)

(58) Field of Classification Search
None
See application file for complete search history.

(56) References Cited

U.S. PATENT DOCUMENTS

| | | | | |
|---|---|---|---|---|
| 6,574,742 | B1 * | 6/2003 | Jamroga | G06F 17/3028 705/2 |
| 6,701,437 | B1 * | 3/2004 | Hoke et al. | 726/15 |
| 6,772,226 | B1 * | 8/2004 | Bommareddy et al. | 709/245 |
| 7,502,841 | B2 | 3/2009 | Small et al. | |
| 7,734,497 | B2 * | 6/2010 | Kelley | G06Q 20/3676 705/302 |
| 7,953,725 | B2 * | 5/2011 | Burris | G06F 17/30707 707/706 |
| 8,296,839 | B2 | 10/2012 | Sax et al. | |
| 8,442,230 | B1 | 5/2013 | Ng et al. | |
| 8,908,698 | B2 | 12/2014 | Aguayo et al. | |
| 2002/0138577 | A1 * | 9/2002 | Teng | G06F 21/41 709/205 |
| 2003/0110512 | A1 * | 6/2003 | Maari | 725/131 |
| 2003/0130906 | A1 * | 7/2003 | Maari | 705/26 |
| 2003/0191937 | A1 * | 10/2003 | Balissat et al. | 713/163 |
| 2006/0002289 | A1 * | 1/2006 | Menon et al. | 370/216 |
| 2006/0002409 | A1 * | 1/2006 | Menon et al. | 370/409 |
| 2006/0064469 | A1 * | 3/2006 | Balasubrahmaniyan et al. | 709/218 |
| 2006/0173708 | A1 * | 8/2006 | Vining | A61B 5/0002 705/2 |
| 2007/0298848 | A1 * | 12/2007 | Babin | H04L 29/12471 455/574 |
| 2008/0046995 | A1 * | 2/2008 | Satterlee et al. | 726/15 |
| 2008/0155121 | A1 * | 6/2008 | Jamieson et al. | 709/242 |
| 2008/0172732 | A1 * | 7/2008 | Li et al. | 726/15 |
| 2009/0080657 | A1 * | 3/2009 | Asati | H04L 9/083 380/277 |
| 2009/0222542 | A1 * | 9/2009 | Miyajima | G06F 9/5077 709/222 |
| 2010/0017500 | A1 * | 1/2010 | Lee | H04L 67/104 709/219 |
| 2010/0034207 | A1 * | 2/2010 | Mcgrew | H04L 45/50 370/401 |
| 2010/0077204 | A1 * | 3/2010 | Kawano | H04L 63/06 713/153 |
| 2010/0128707 | A1 * | 5/2010 | Horio | H04L 12/4641 370/338 |
| 2011/0022652 | A1 * | 1/2011 | Lai | H04L 67/104 709/202 |
| 2011/0022693 | A1 * | 1/2011 | Cheethirala | H04L 49/357 709/222 |
| 2011/0060902 | A1 * | 3/2011 | Nagata | H04L 12/4641 713/155 |
| 2011/0162062 | A1 * | 6/2011 | Kumar et al. | 726/15 |
| 2011/0209217 | A1 * | 8/2011 | Miyama | G06F 21/53 726/22 |
| 2012/0082162 | A1 * | 4/2012 | Li et al. | 370/392 |
| 2013/0315249 | A1 | 11/2013 | Tanimoto | |

* cited by examiner

*Primary Examiner* — Ninos Donabed
(74) *Attorney, Agent, or Firm* — McDermott Will & Emery LLP (57) ABSTRACT

A method, system and computer program product for managing pooled VPN proxy servers by a central server is provided. The method includes receiving information from a plurality of computers wherein the information received is used for registering, with a central server, the respective computer as a VPN proxy server. The method also includes receiving a request from a client device for a VPN proxy server and sending a list of registered VPN proxy servers to the client device.

24 Claims, 7 Drawing Sheets

MANAGING POOLED VPN PROXY SERVERS BY A CENTRAL SERVER

FIELD

Embodiments of the present application generally relate to managing pooled resources of proxy servers.

BACKGROUND

As the amount of browsing content available on various wide-area networks such as the Internet increases, viewing and downloading content available on the Internet securely and privately without being tracked or having data compromised has become especially important. A virtual private network (VPN) is a private network that interconnects remote networks through primarily public communication infrastructure such as the Internet. VPNs provide security through tunneling protocols and security procedures such as encryption.

BRIEF SUMMARY

A method for pooling network resources between two network-connected applications is provided.

An example method includes receiving, at the central server, information from a plurality of computers, wherein the information received from each of the plurality of computers is used for registering, with the central server, the respective computer as a VPN proxy server. The method further includes registering each of the plurality of the computers as a VPN proxy server for a respective VPN connection, wherein the VPN connection is between the respective VPN proxy server and a respective client. The method also includes maintaining a dynamic list of registered VPN proxy servers, receiving a request from a client for a VPN proxy server, and sending a list of registered VPN proxy servers to the client.

Further features and advantages, as well as the structure and operation of various embodiments are described in detail below with reference to the accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

The following detailed description refers to the accompanying drawings that illustrate example embodiments consistent with this invention. Other embodiments are possible, and modifications may be made to the embodiments within the spirit and scope of the invention. Therefore, the detailed description is not meant to limit the invention.

The embodiment(s) described and references in the specification to "one embodiment," "an embodiment," "an example embodiment," etc., indicate that the embodiment(s) described may include a particular feature, structure, or characteristic. However, every embodiment may not necessarily include the particular feature, structure or characteristic. Moreover, such phrases are not necessarily referring to the same embodiment. When a particular feature, structure or characteristic is described in connection with an embodiment, it is understood that it is within the knowledge of one skilled in the art to effect such feature, structure, or characteristic in connection with other embodiments, whether or not explicitly described.

It would be apparent to one of skill in the relevant art that the embodiments described below can be implemented in many different embodiments of software, hardware, firmware, and/or the entities illustrated in the figures. Any actual software code with the specialized control of hardware to implement embodiments is not limiting of this description. Thus, the operational behavior of embodiments is described with the understanding that modifications and variations of the embodiments are possible, given the level of detail presented herein.

There are various problems associated with using VPN servers, especially when one is trying to install and configure a VPN server. For example, a user may encounter technical issues during installation and configuration of a VPN server. Costs associated with purchasing and maintaining a VPN server is relatively high as well.

Additionally, a user has to manually select a VPN server to connect to the Internet. For example, a user may instruct a client device to try to connect to a VPN server. A VPN server may not be available due to various reasons (for example, the server may be have been taken offline for maintenance or down due to network connectivity issues). If connection to the selected VPN server fails, the user has to manually select another VPN server. This process of manually going through a list of VPN servers is inefficient.

Embodiments disclosed herein address the problems described. Embodiments disclosed relate to managing pooled VPN proxy servers by a central server. A plurality of computers register as VPN proxy servers with the central server. The central server maintains a dynamic list of registered VPN proxy servers and sends the dynamic list of VPN proxy servers to a client when a request is received from the client. The client automatically selects a VPN proxy server from the list of VPN proxy servers received from the central server and establishes a connection to the VPN proxy server. In an embodiment, the client may select a VPN proxy server based on geographic location, bandwidth of a VPN proxy server, or a combination of these features.

Figure 1:
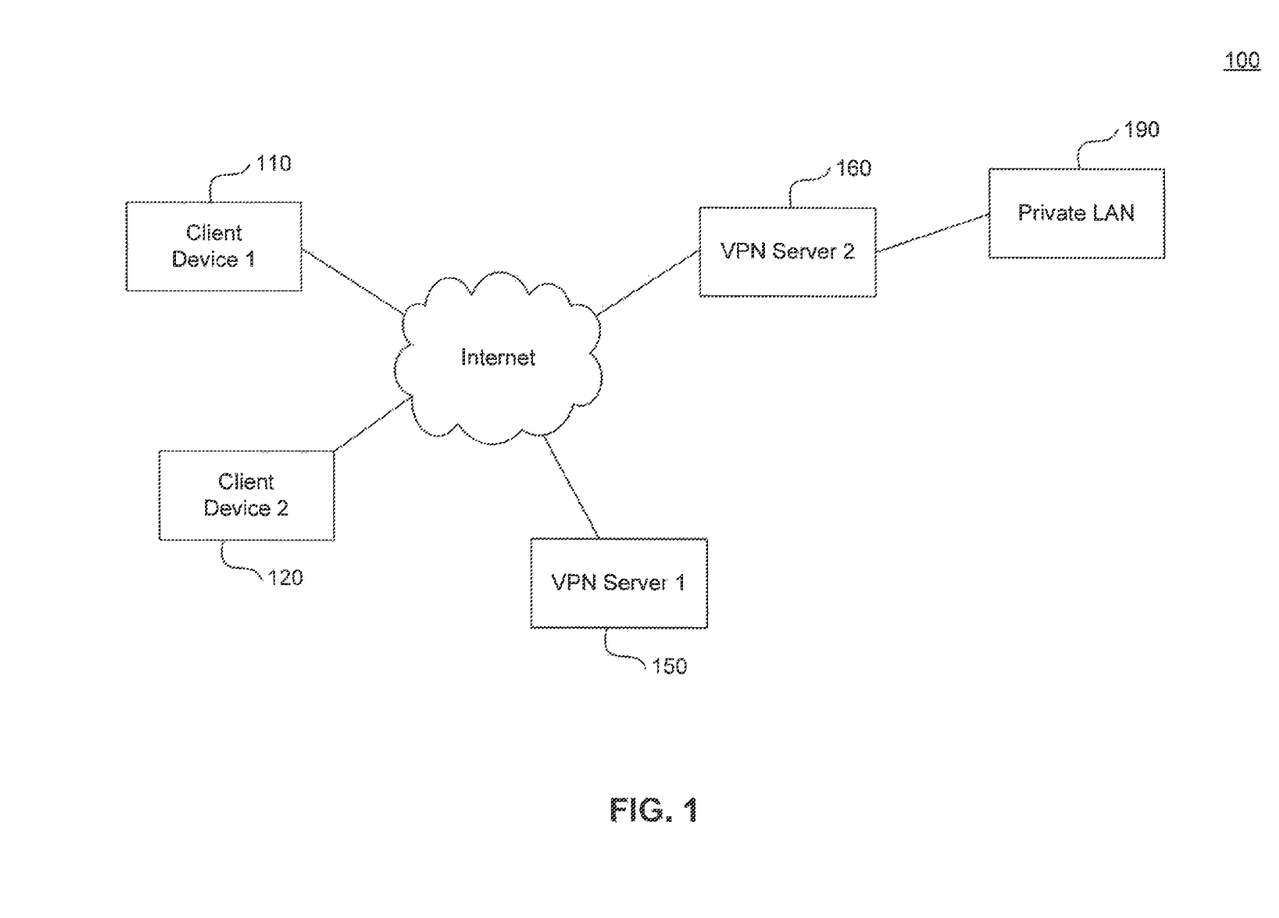
FIG. 1 is a diagram illustrating a traditional network architecture of a VPN network.

FIG. 1 is a diagram illustrating a traditional network architecture of a VPN network.

A virtual private network (VPN) is a private network that interconnects remote networks through primarily public communication infrastructure such as the Internet. VPNs provide security through tunneling protocols and security procedures such as encryption. For example, a VPN may be used to securely connect branch offices of an organization to a head office network through the public Internet. A VPN can also be used to interconnect two similar-type networks over a dissimilar middle network. For example, two IPv6 networks can be connected over an IPv4 network using a VPN.

Remote-access VPNs and site-to-site VPNs are two main types of VPNs. Remote-access VPNs allow individual users to connect to a remote network, such as in the case of travelling employees connecting to their company's intranet. Site-to-site VPNs allow inter-connection of networks of multiple users, such as connecting branch offices to a company's main network. VPNs reduce costs as they eliminate the need for dedicated leased lines between networks by using existing public internet infrastructure to connect networks, and add a layer of security to transmissions over the public Internet.

VPNs generally require users to be authenticated before secure VPN tunnels can be established. VPNs use various encryption techniques to prevent disclosure of private information to unauthorized parties present on public internet. For example, VPNs may use passwords, biometrics, or any other cryptographic methods known by persons skilled in the relevant art. VPNs also allow users to access remote resources, such as a company's internal web sites, databases, or other confidential information, in a secure manner.

VPNs allow peers to authenticate each other using a pre-shared secret key, certificates, or username/password configurations. When used in a multi client-server configuration, VPNs allow a server to release an authentication certificate for every client, using signature and certificate authority.

OpenVPN and Open proxy are two examples of VPN solutions that may be used for communication over public internet. OpenVPN is an open source software application that implements VPN techniques for creating secure point-to-point or site-to-site connections in routed or bridged configurations and remote access facilities. OpenVPN uses a custom security protocol that utilizes Secured Sockets Layer/Transport Layer Security (SSL/TLS) for key exchange. OpenVPN is also capable of traversing network address translators (NATs) and firewalls.

As will be appreciated by persons skilled in the relevant art, OpenVPN uses an OpenSSL library to provide encryption of both the data and control channels. OpenVPN lets OpenSSL perform all encryption and authentication work, allowing OpenVPN to use all the ciphers available in the OpenSSL package. OpenVPN may use other authentication mechanisms such as Hash-based Message Authentication Code (HMAC). OpenVPN may also use hardware acceleration to get better encryption performance.

In a VPN, data transmitted from a client is routed through a VPN server which adds an authentication header for routing and authentication. The data is then encrypted and enclosed with an Encapsulating Security Payload. The Encapsulating Security Payload contains decryption and handling instructions. A receiving VPN server removes header information, decrypts data, and routes the data to its intended destination.

With such an additional level of security, an intruder has to not only intercept a packet, but decrypt the packet as well. Intruders who employ a man-in-the-middle attack between a server and a client must also have access to at least one private key for authenticating sessions. As VPN employs several layers of authentication and encryption, VPN connections provide a secure and effective means of connecting to the Internet. A VPN solution is available on various platforms such as Solaris, Linux, Mac OS X, and Windows. VPN is also available on mobile phone operating systems. Although, embodiments herein refer to VPN, protocols similar to VPN may also be used.

In a traditional VPN network 100, client devices 110 and 120, and VPN servers 150 and 160 are connected over a wide area network (WAN) as shown in FIG. 1. The WAN may be, for example, the Internet. VPN servers 150 or 160 may provide VPN service for client devices 110 and 120. VPN server 160 may also provide connectivity for client devices 110 and 120 to a private local area network (LAN) 190. For example, private LAN 190 may be a corporate network for which access is secured.

VPN works over any type of internet connection—WiFi, cellular or wired. For example, client devices 110 and 120 may connect to VPN servers 150 or 160 through WiFi or cellular connection. Client devices 110 and 120 may connect to VPN servers 150 or 160 through a wired connection (e.g., Ethernet, DSL, FiOS, etc.).

Client devices 110 and 120 may connect directly to the Internet without going through VPN servers 150 or 160, or connect to the Internet by establishing a connection through VPN Servers 150 or 160 which allows client devices 110 and 120 to securely and anonymously access the Internet and download any content from the Internet. Client devices 110 and 120 may also access private LAN 190 by connecting through VPN server 160, as private LAN 190 is connected to VPN server 160.

However, there are various problems associated with using VPN servers, especially when one is trying to install and configure a VPN server. The installation and configuration of a VPN server may be for personal use as some corporations/employers discourage use of corporate networks by employees for personal use. The installation and configuration of a VPN server may also be for use by a small business. For example, a user may encounter technical issues during installation and configuration of VPN servers. Costs associated with purchasing and maintaining VPN servers is relatively high as well.

Additionally, a user has to manually select a VPN server to connect to the Internet. For example, a user may instruct client device 110 to try to connect to VPN server 150. VPN server 150 may not be available due to various reasons (for example, the server may be have been taken offline for maintenance or down due to network connectivity issues). If connection to VPN server 150 fails, the user has to manually select another VPN server (for example, VPN server 160) for VPN service. This process of manually going through a list of VPN servers is inefficient.

Figure 2:
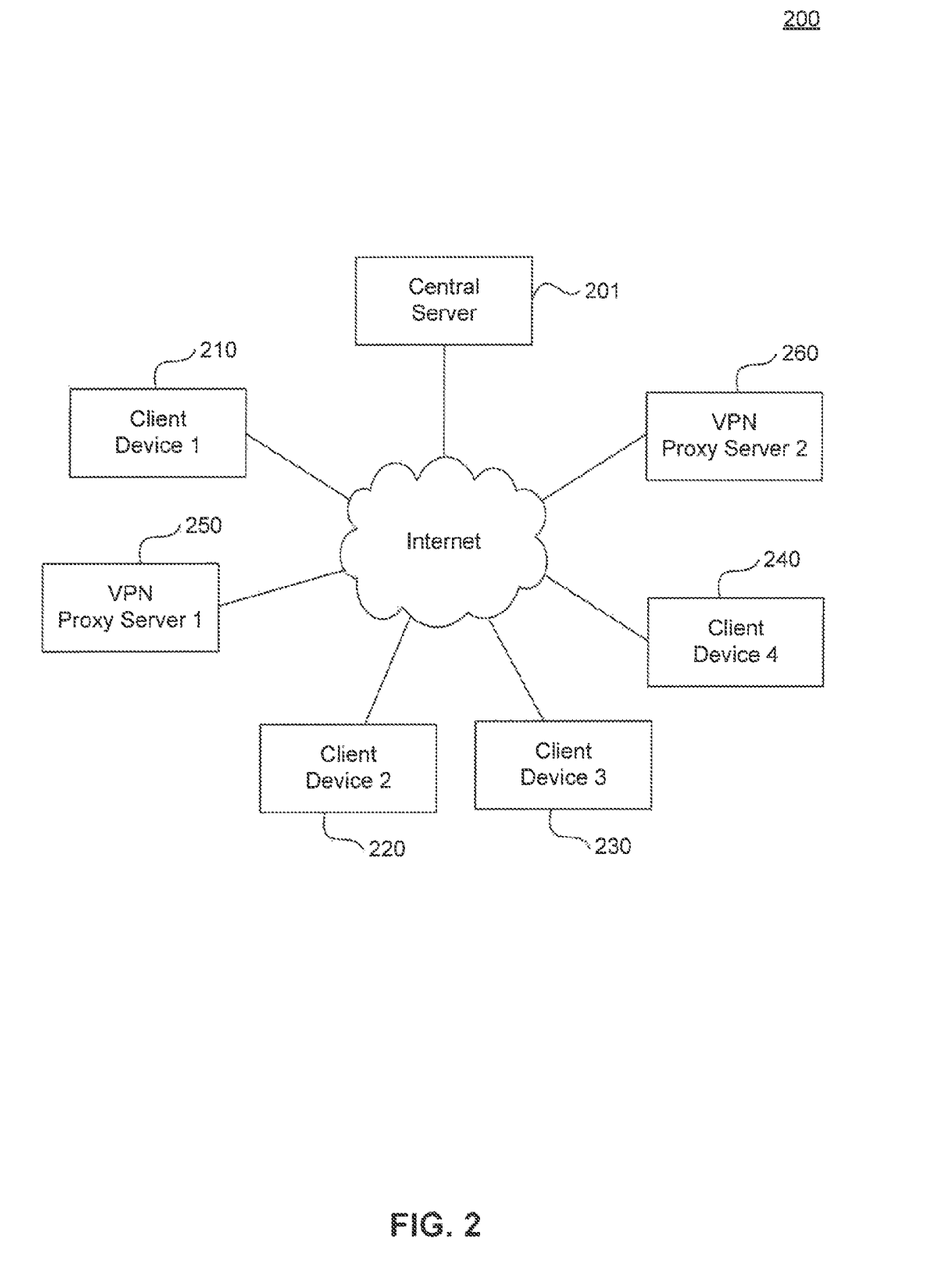
FIG. 2 is a diagram illustrating a central server managing pooled resources of VPN proxy servers, according to an embodiment.

FIG. 2 is a diagram illustrating a central server 201 managing pooled resources of VPN proxy servers, according to an embodiment.

FIG. 2 shows devices 250 and 260 that are registered with central server 201 as VPN proxy servers 250 and 260. Devices (for example, 250 and 260) register as VPN proxy servers to permit other devices (for example, client devices 210, 220, 230 and 240) use them as VPN proxy servers to access content securely and privately on the Internet.

During registration with central server 201, VPN proxy servers 250 and 260 may provide information that may be used by central server 201 for storing in its database. For example, the information provided by VPN proxy servers 250 and 260 during their registration process with central server 201 may include their respective geographic location (country, state/province, city, etc.) at registration time. The information may also include a type or bandwidth of their connection to the Internet. For example, this may be a connection type (for example, DSL, FiOS, cable, cellular or Wi-Fi, etc.) or speed of the Internet connection (for example, 10 Mbps, 25 Mbps or 50 Mbps, etc.). Additionally, VPN proxy servers may identify their platform type during registration (for example, desktop, laptop, touch pad or mobile phone, etc.).

For example, the database of central server 201 may contain information on registered VPN proxy servers 250 and 260 such as proxy server name, location, and bandwidth Info. For example:

VPN Proxy Server 1, Austin/TX, DSL/0 Mbps
VPN Proxy Server 2, Dallas/TX, FiOS/50 Mbps Central server 201 stores information provided by VPN proxy servers during their registration process in its database located on central server 201. The database may be any database with store and search capabilities which are familiar to a person skilled in the relevant art. For example, the database used may be an Oracle or SQL database.

One or more central servers may be configured as central server 201. Optional features such as redundancy (hot standby or cold standby) or load sharing may be implemented to improve performance or reliability of the central server. The central server may be a distributed system and may be a multi-master system that enables synchronization of data across the distributed system to improve data consistency. For example, when customer's information changes in one master central server, the data may be replicated on other master central servers to improve consistency of data across the various central servers. Additionally, the central server may be identified based on the geographic location of the central server. Users of client devices 210, 220, 230 and 240 may want to securely and anonymously (or privately) browse the Internet using VPN service. If client devices do not have access to their own private VPN, client devices may communicate with central server 201 for VPN service through one of the registered VPN proxy servers.

In an embodiment, the central server may manage VPN proxy alliances and may provide an authentication mechanism for customers, manage user profiles, and provide a list of optimized VPN proxy servers to users.

Client device 210 downloads software from central server 201 and installs the software locally on the device. The software downloaded and installed includes a list of registered VPN proxy servers. The software installed may automate the connection process (reducing a number of manual steps required by VPN users to complete the connection process), and provide VPN connection to the Internet. Once central server 201 sends the list of registered VPN proxy servers to client device 210, client device 210 selects the most appropriate proxy server based on the preferences of the client. In an embodiment, the software installed on a client device may detect VPN proxy servers and identify optimal VPN proxy servers for use. Such a list of registered VPN proxy servers may be received from any central server or trusted VPN proxy alliance member.

For example, when a user requests a VPN connection to the Internet, software installed on client device 210 accesses the list of registered VPN proxy servers received from central server 201, and may filter the list of VPN proxy servers to identify VPN proxy servers that would provide an optimal connection. For example, client device 210 may identify those proxy servers located most closely geographically. In another example, client device 210 may identify those proxy servers whose bandwidth capabilities most match the bandwidth capabilities of client device 210. In another example, client device 210 may identify optimal proxy VPN servers based on a combination of these features. Other optimization factors or preferences may also be considered.

In an embodiment, client device manager, which is a part of the software downloaded from central server 201 and installed on client device 210 may be responsible for filtering VPN proxy servers to identify the optimal VPN proxy servers.

In an embodiment, software installed on client device 210 may allow client device 210 to configure one or more groups of VPN proxy servers, where each group may contain one or more VPN proxy servers. For example, VPN proxy server 250 may be configured as a primary VPN proxy server, and VPN proxy server 260 may be configured as a secondary VPN proxy server.

Once client device 210 has identified the optimal proxy servers, client device 210 tries to establish a VPN connection to the most optimal VPN proxy servers. If a connection is established, then client device 210 accesses the Internet through a VPN proxy server. If a connection is not established, the software installed on client device 210 automatically traverses down the list of the optimal VPN proxy servers identified above until a VPN connection is established.

In an embodiment, client device 210 may register with central server 201 for any updates from central server 201. In an embodiment, client device 210 may send its location information (country, state/province, city, etc.), bandwidth information, and details of client platform to central server 201.

In an another embodiment, client device 210 may send its preferences, such as its geographic location or the location of VPN proxy servers client device 210 would like to use. For example, client device 210 may send its geographic location to central server 201 so that central server 201 can select VPN proxy servers that are closest geographically to client device 210. In another example, client device 210 may notify central server 201 that client device 210 would like to use VPN proxy servers located in Texas (first), California (second), United States (third), and so on. This may allow users flexibility in selecting their VPN proxy server location. However, this may not be always possible as it depends on proxy servers being available in the selected region. Client device 210 may specify its preferences with regard to bandwidth of available proxy servers. For example, client device 210 may specify that it prefers VPN proxy servers with at least 10 Mbps bandwidth to the Internet.

Based on information (and/or preferences) received from client device 210, central server 201 searches its database of registered VPN proxy servers and provides a list of VPN proxy servers to client device 210. As will be appreciated by persons skilled in the relevant art, the search may be performed using search criteria (preferences) identified by client device 210. If client device 210 specified no preferences, central server 201 will return a list of available VPN proxy servers to client device 210. In an embodiment, the list of VPN proxy servers may be encrypted prior to sending to a client device. The list of VPN proxy servers received by client device 210 are stored locally on client device 210. In an embodiment, client device 210 may communicate with central server 201 to update the list of its VPN proxy servers.

This may be done at pre-configured regular intervals, on demand by a client device, or when central server 201 sends updates to registered client devices.

In an embodiment, client device 210 may receive a list of VPN proxy servers meeting the client device's preferences. For example, client device 210 may receive a list of VPN proxy servers that include VPN proxy servers 250 and 260. Client device 210 automatically tries connecting to VPN proxy server 250. However, connection to VPN proxy server 250 may fail due to various reasons. For example, VPN proxy server 250 may have lost its connection to the Internet or may be down due to software or hardware failure. In such cases, there is no need for manual intervention by user of client device 210. Client device 210 automatically traverses the list of VPN proxy servers received from central server 201 until a successful VPN connection is established. This addresses problems associated with existing implementations where a user has to manually search and log into VPN servers for VPN service when a connection to a selected VPN servers fails.

In an embodiment, client device 210 may notify central server 201 if client device 210 fails to establish a VPN connection with a VPN proxy server in its list. For example, client device 210 may have failed to establish a VPN connection with VPN proxy server 250. In such cases, client device 210 notifies central server 201 so that central server 201 may update its database. In an embodiment, central server 201 may notify registered client devices to update their list of VPN proxy servers.

Figure 3:
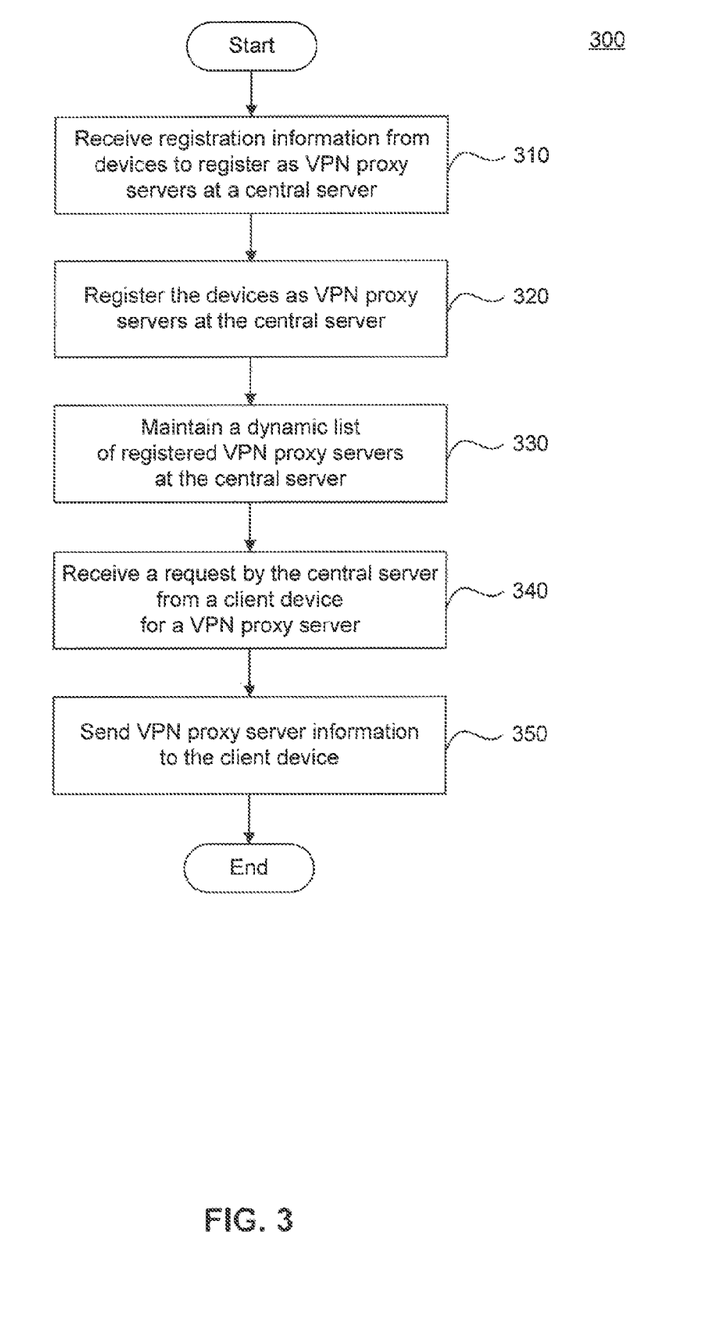
FIG. 3 is a flowchart of a method for registering VPN proxy servers with a central server and sending VPN proxy server information to a client device, according to an embodiment.

FIG. 3 is a flowchart of step method 300 for registering VPN proxy servers with a central server and sending VPN proxy server information to a client device, according to an embodiment.

As shown in FIG. 3, an embodiment of method 300 begins at stage 310, where a central server receives a request from one or more devices to register as a VPN proxy server. For example, central server 201 may receive a registration request from devices 250 or 260 to register as VPN proxy servers.

Registering devices may send information such as geographic location, bandwidth of connection to the Internet and/or any other information useful for registration with the central server. For example, information provided by VPN proxy servers 250 and 260 during their registration process with central server 201 may include their Internet Protocol (IP) address, and/or Media Access Control (MAC) address, and geographic location (country, state/province, city, etc.) at registration time. The information may include a type or bandwidth of their connection to the Internet. For example, this may be a connection type (e.g., DSL, FiOS, cable, cellular or Wi-Fi, etc.) or a speed of the Internet connection (for example, 10 Mbps, 25 Mbps or 50 Mbps, etc.). Additionally, VPN proxy servers may identify their platform type during registration (for example, desktop, laptop, touch pad or mobile phone, etc.). Once stage 310 is complete, method 300 proceeds to stage 320.

At stage 320, the central server processes information received from the devices and registers them as VPN proxy servers. For example, central server 201 processes information received from devices 250 or 260 and registers them as VPN proxy servers. The number of VPN proxy servers is not limited to two, which is used for illustration purposes only. The number of VPN proxy servers registered with the central server may depend on number of devices available, and may run into the thousands or millions. Once stage 320 is complete, method 300 proceeds to stage 330.

At stage 330, after registration of VPN proxy servers is complete, the central server stores registration information in its database so that it can perform a search when a request for a list of VPN proxy servers is received. For example, a search may be performed by central server 201 based on search criteria received from client device 210 or 220.

Central server 201 maintains a dynamic listing of all registered VPN proxy servers, and updates the listing according to any information or updates received from client devices or VPN proxy servers. This allows central server 201 to keep an up-to-date, valid list of VPN proxy servers. In an embodiment, central server 201 may also de-register a VPN proxy server if central server 201 receives information from a client device 210 that a VPN proxy server is unreachable.

Optionally, central server 201 may be configured to ping registered VPN proxy servers to update the listing of registered VPN proxy servers. For example, central server 201 may ping registered VPN proxy servers at pre-configured times, and mark its status as "Not Responding" if central server 201 fails to receive a response after one or more pings. Optionally, central server 201 may ping registered proxy devices on demand to update the listing of registered proxy servers. Once stage 330 is complete, method 300 proceeds to stage 340.

At stage 340, the central server receives a request from a client device for a list of VPN proxy servers. For example, central server 201 may receive a request from client device 210 for a list of VPN proxy servers. Central server 201 process the request received from client device 210. Once stage 340 is complete, method 300 proceeds to stage 350.

At stage 350, the central server sends the list of VPN proxy servers to the client device. For example, central server 201 sends the list of VPN proxy servers from its database to client device 210. For example, central server 201 may send information on VPN proxy servers 250 and 260 to client device 210. The information sent by central server 201 may also include the geographic location of the VPN proxy servers and available bandwidth. Once stage 350 is complete, method 300 ends.

Figure 4:
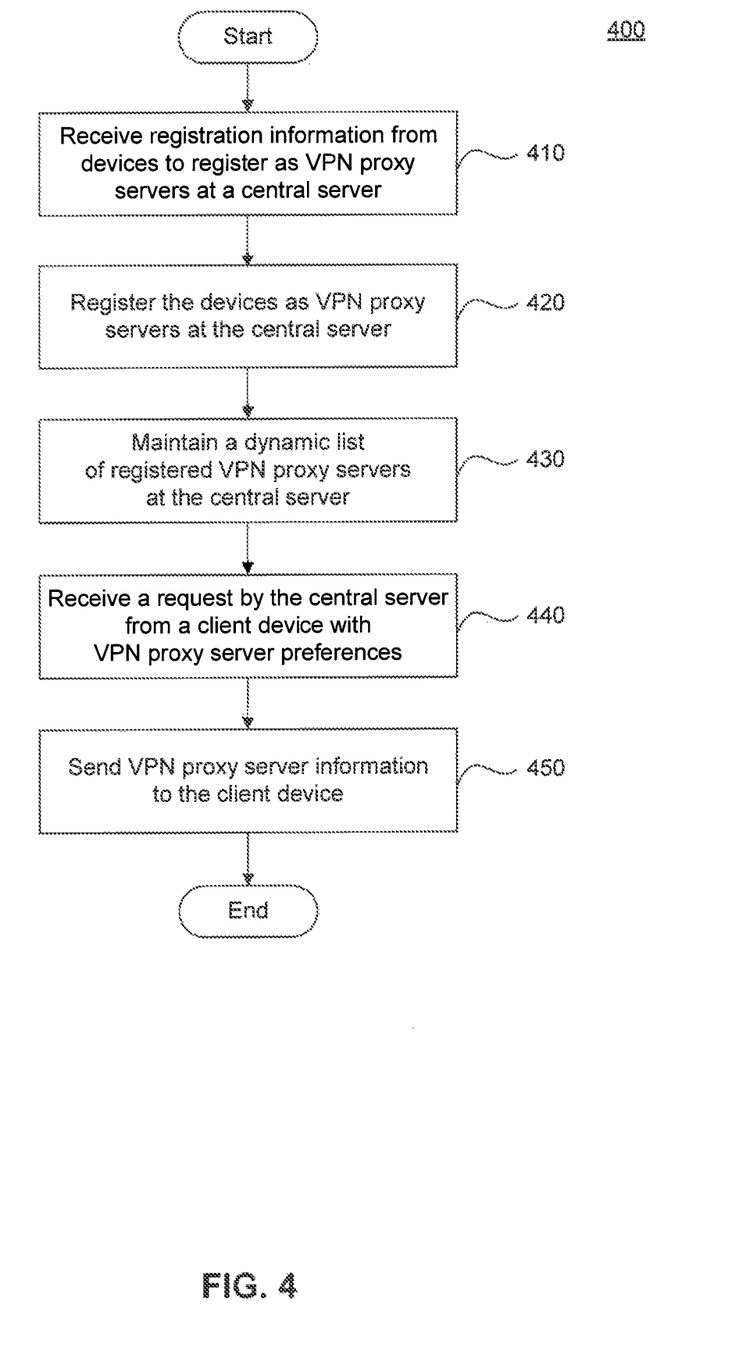
FIG. 4 is a flowchart of a method for registering VPN proxy servers with a central server and sending VPN proxy server information based on client device preferences, according to an embodiment.

FIG. 4 is a flowchart of another method 400 for registering VPN proxy servers with a central server and sending VPN proxy server information based on client device preferences to a client device, according to an embodiment.

As shown in FIG. 4, an embodiment of method 400 begins at stage 410, where a central server receives a request from one or more devices to register as a VPN proxy server. Stage 410 is similar to stage 310 of FIG. 3 described above in detail. Once stage 410 is complete, method 400 proceeds to stage 420.

At stage 420, the central server processes information received from the devices and registers them as VPN proxy servers. Stage 420 is similar to stage 310 of FIG. 3 described above in detail. Once stage 420 is complete, method 400 proceeds to stage 430.

At stage 430, after registration of VPN proxy servers is complete, the central server stores registration information in its database so that it can perform a search when a request for a list of VPN proxy servers is received. Stage 430 is similar to stage 330 of FIG. 3 described above in detail. Once stage 430 is complete, method 400 proceeds to stage 440.

At stage 440, the central server receives a request from a client device for a list of VPN proxy servers. For example, central server 201 may receive a request from client device 210. The request from client device 210 may include parameters defining its request. For example, the request from client device 210 may include a geographic location of the client device, a preference for a particular geographic location of VPN proxy servers (for example, Dallas, Tex., USA) and/or a requested bandwidth (for example, broadband connection or 10 Mbps, etc.).

Central server 201 performs a search of its database containing the listing of registered VPN proxy servers that matches the preferences identified by client device 210. In an embodiment, if central server 201 cannot locate any registered VPN proxy servers that match the requested preferences of client device 201, central server 201 may optionally search for registered VPN proxy servers that closely match the criteria requested by client device 210 (for example, registered VPN proxy servers located in Austin, Tex. or Houston, Tex., etc.). Once stage 440 is complete, method 400 proceeds to stage 450.

At stage 450, the central server sends the results of its search to the client device. Stage 450 is similar to stage 350 of FIG. 3 described above in detail. For example, central server 201 may send its search results to client device 210. These search results contain a list of registered VPN proxy servers along with information such as their geographic location and available bandwidth. Once stage 450 is complete, method 400 ends.

Figure 5:
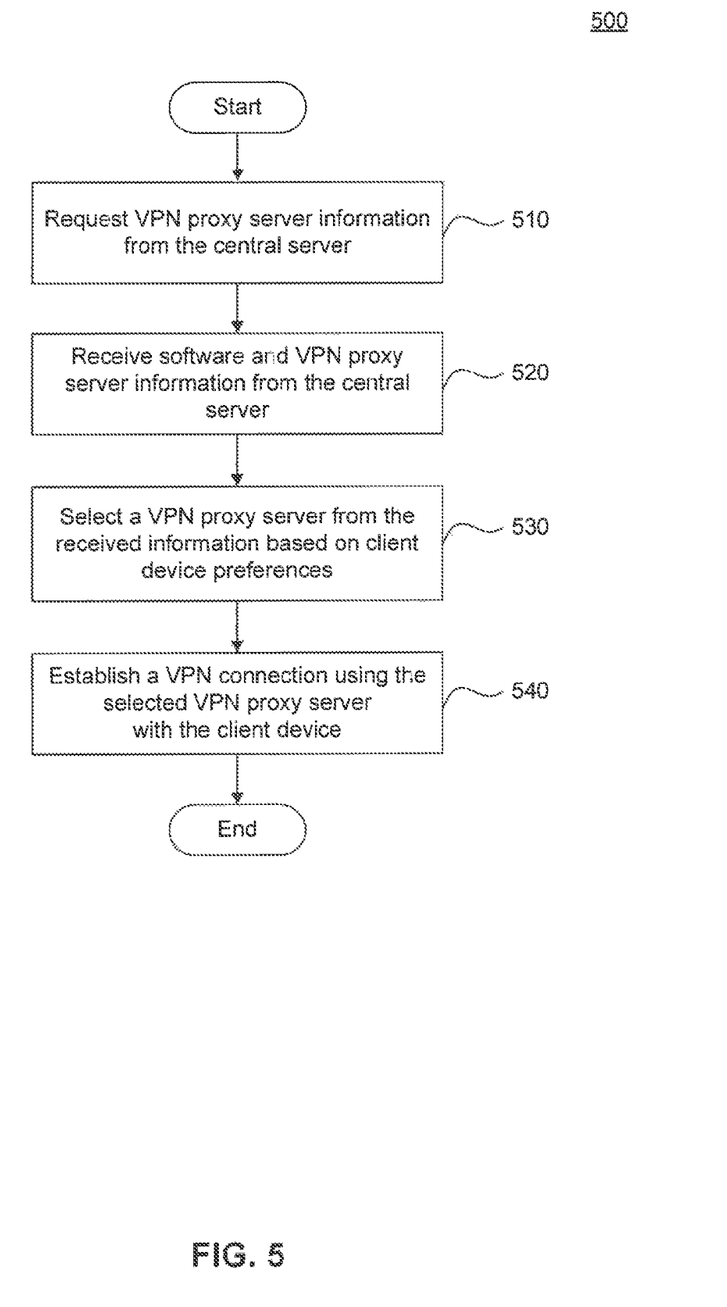
FIG. 5 is a flow chart of a method for receiving a list of VPN proxy servers from a central server and establishing VPN connection with a VPN proxy server, according to an embodiment.

FIG. 5 is a flow chart of a method 500 for receiving a list of VPN proxy servers from a central server and establishing a VPN connection with a VPN proxy server, according to an embodiment. FIG. 5 is the client side counterpart to FIG. 3.

As shown in FIG. 5, an embodiment of method 500 begins at stage 510 when one or more client devices requests a list of registered VPN proxy servers from the central server. For example, client devices 210, 220, 230, or 240 may request a list of registered VPN proxy servers from central server 201. Once stage 510 is complete, method 500 proceeds to stage 520.

At stage 520, one or more client devices receives software and a list of VPN proxy servers from the central server for VPN service. For example, client device 210 receives software from central server 201 and the software is installed on client device 210. A client device also receives a list of VPN proxy servers from the central server when the software is downloaded to the client device. For example, client device 210 receives a list of proxy VPN servers from central server 201. Once stage 520 is complete, method 500 proceeds to stage 530.

At stage 530, one or more client devices selects a respective VPN proxy server from the list of registered VPN proxy servers received from the central server for VPN service. The selection of a VPN proxy server may be based on the preferences of the client device. For example, client device 210 may select registered VPN proxy server 250 from the list of VPN proxy servers received from central server 201 for VPN service based on preferences of client device 210. For example, client device 210 may select VPN proxy server 250 to connect to the Internet because VPN proxy server 250 meets a location preference of client device 210. For example, preference of client device 210 is a VPN proxy server located in Dallas, Tex., and VPN proxy server 250 is located in Dallas, Tex. In another example, client device 210 may select VPN proxy server 250 because VPN proxy server 250 is the closest VPN proxy server geographically. The distance between client device 210 and VPN proxy servers 250 may be automatically calculated by client device 210.

The selection of a VPN proxy server for VPN connecting is automated and may be initiated based on a user trying to connect to the Internet. If the client device cannot access the selected VPN proxy server due to any reason (for example, the VPN proxy server or its network connection is down), the client device may use another VPN proxy server in the list to establish the VPN connection. For example, if client device 210 cannot access VPN proxy server 250, the software will try connecting to VPN proxy server 260 to establish a VPN connection to the Internet. In an embodiment, a client device notifies the central server that the VPN proxy server is not responding with the IP address of the VPN proxy server so that the central server can update its VPN proxy server database accordingly. For example, client device 210 may notify central server 201 that VPN proxy server 250 is not responding. Once stage 430 is complete, method 400 proceeds to stage 440.

At stage 540, one or more client devices establish VPN connections with their respective VPN proxy servers to connect to the Internet. For example, client device 210 may establish VPN connection with the Internet through the selected VPN proxy server 250. This allows client device 210 to securely and privately access the Internet. Once stage 540 is complete, method 500 ends.

Figure 6:
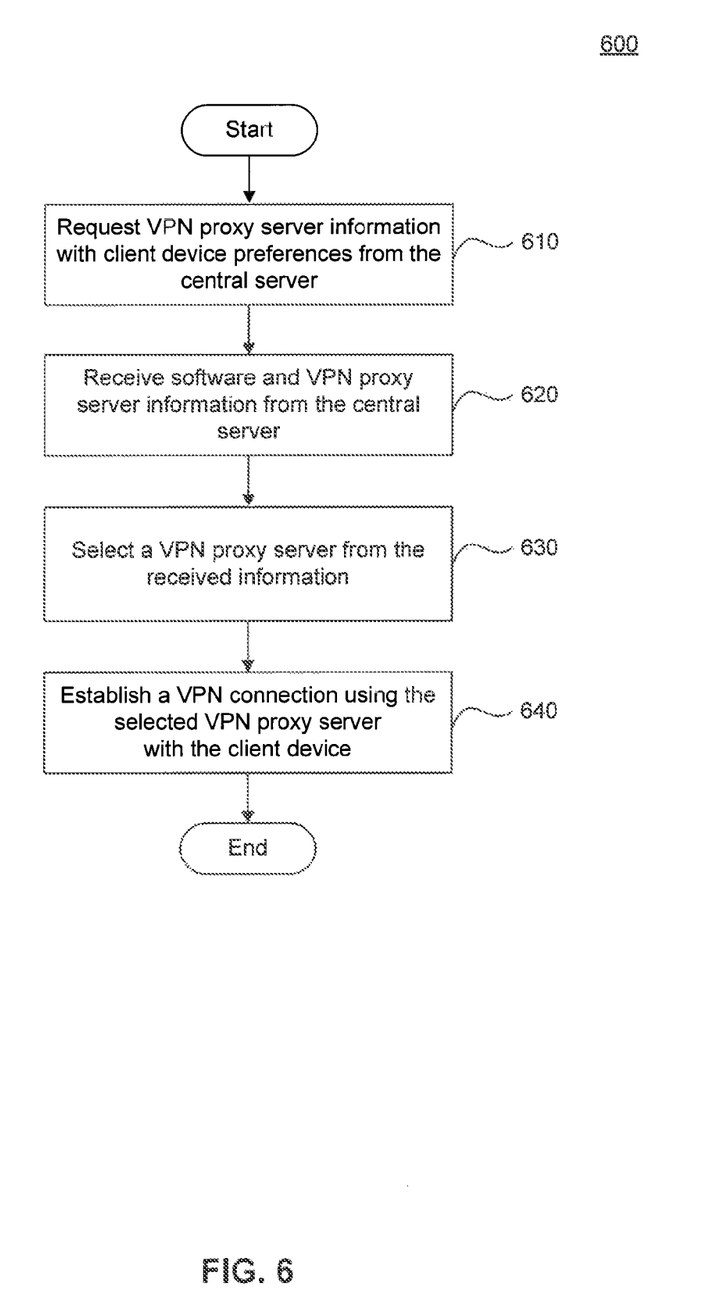
FIG. 6 is a flow chart of a method for receiving a list of VPN proxy servers based on client device preferences from a central server, according to an embodiment.

FIG. 6 is a flow chart of a method 600 for receiving a list of VPN proxy servers based on client device preferences from a central server, according to an embodiment. FIG. 6 is the client side counterpart to FIG. 4.

As shown in FIG. 6, an embodiment of method 600 begins at stage 610 when one or more client devices request a list of registered VPN proxy servers with client device preferences from the central server. For example, client device 210 may request a list of registered VPN proxy servers from central server 201 identifying preferences of client device 210.

In an embodiment, one or more client devices may request a list of VPN proxy servers from the central server, which request may include preferences of a client device with regard to VPN proxy servers. For example, client device 210 may include preferences of client device 210 with regard to VPN proxy servers. For example, the request may include a geographic location of client device 20, preferences for a particular geographic location of VPN proxy servers (for example, Dallas, Tex., etc.) and a requested bandwidth (for example, broadband connection or 10 Mbps, etc.).

In an embodiment, if central server 201 could not locate any registered VPN proxy servers as per the request from client device 210, central server 201 may search for registered VPN proxy servers that may closely match the request from client device 210, and provide the list of registered VPN proxy servers closely matching the request to client device 210. In an embodiment, the central server may notify a client device if the central server cannot locate any registered VPN proxy servers that match preferences of the client device. For example, central server 201 may notify client device 210 if central server 201 cannot locate any registered VPN proxy servers that match preferences of client device 210. Once stage 610 is complete, method 600 proceeds to stage 620.

At stage 620, one or more client devices receives software from the central server for VPN service. For example, client device 210 receives software from central server 201. Once the software is downloaded to client device 210, the software is installed on client device 210. In an embodiment, a client device receives a list of VPN proxy servers from the central server when the software is downloaded to the client device. For example, client device 210 may receive a list of VPN proxy servers from central server 201 when software is downloaded to client device 210. Once stage 620 is complete, method 600 proceeds to stage 630.

At stage 630, one or more client devices select a respective VPN proxy server from the list of registered VPN proxy servers received from the central server for VPN service. For example, client device 210 may select registered VPN proxy server 250 from the list of VPN proxy servers received from central server 201 for VPN service.

The selection of a VPN proxy server for VPN connecting is automated and may be initiated based on a user trying to connect to the Internet. If the client device cannot access the selected VPN proxy server due to any reason (for example, the VPN proxy server or its network connection is down), the client device may use another VPN proxy server in the list to establish the VPN connection. For example, if client device 210 cannot access VPN proxy server 250, the software will try connecting to VPN proxy server 260 to establish a VPN connection to the Internet. In an embodiment, a client device notifies the central server that the VPN proxy server is not responding with the IP address of the VPN proxy server so that the central server can update its VPN proxy server database accordingly. For example, client device 210 may notify central server 201 that VPN proxy server 250 is not responding. Once stage 630 is complete, method 600 proceeds to stage 640.

At stage 640, one or more client devices establish VPN connections with their respective VPN proxy servers to connect to the Internet. For example, client device 210 may establish VPN connection with the Internet through the selected VPN proxy server 250. This allows client device 210 to securely and privately access the Internet. Once stage 640 is complete, method 600 ends.

Figure 7:
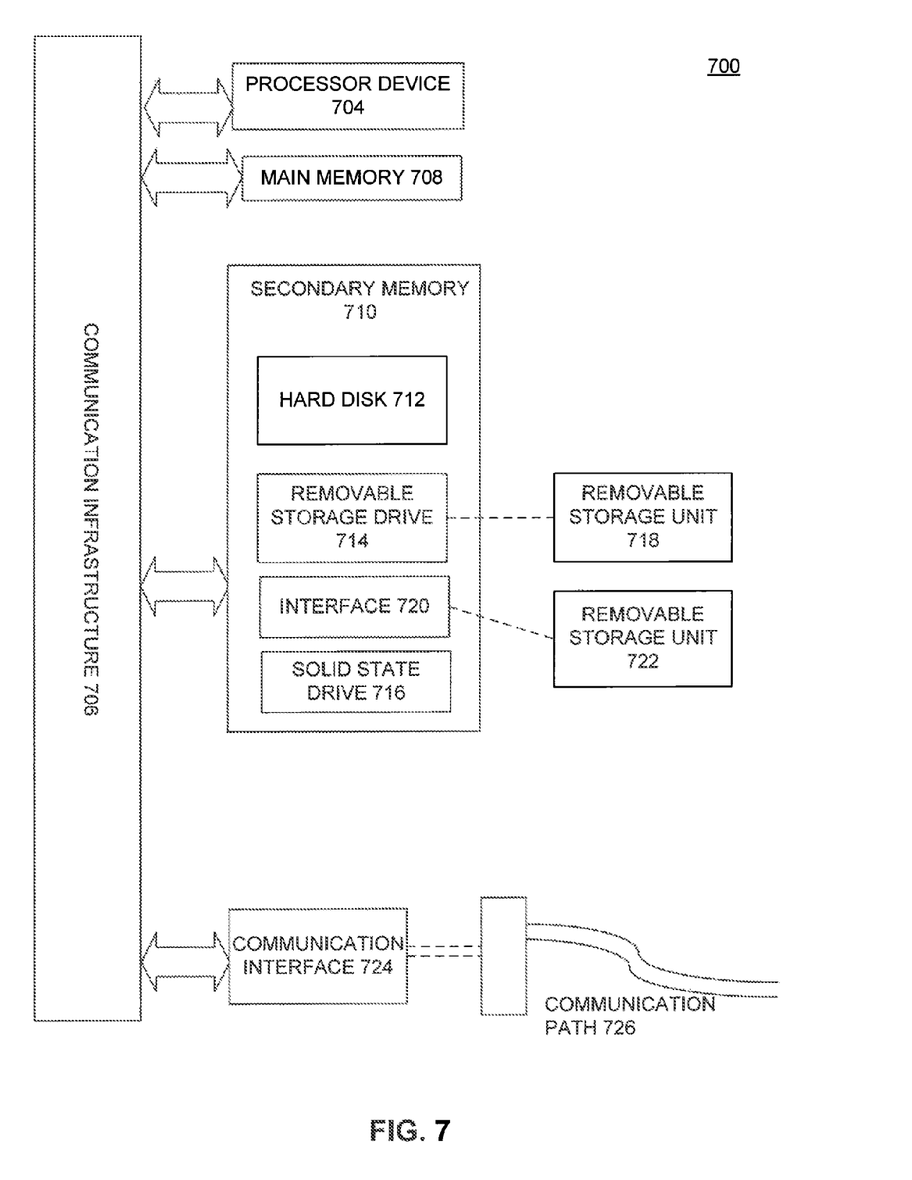
FIG. 7 is a diagram of an example computer system that may be used in an embodiment.

FIG. 7 is a diagram of an example computer system 700 that may be used in an embodiment.

FIG. 7 illustrates an example computer system 700 in which embodiments of the present invention, or portions thereof, may be implemented. For example, portions of systems or methods illustrated in FIGS. 2-6 may be implemented in computer system 700 using hardware, software, firmware, tangible computer readable media having instructions stored thereon, or a combination thereof and may be implemented in one or more computer systems or other processing systems.

If programmable logic is used, such logic may execute on a commercially available processing platform or a special purpose device. One of ordinary skill in the art may appreciate that embodiments of the disclosed subject matter can be practiced with various computer system and computer-implemented device configurations, including multi-core multiprocessor systems, mainframe computers, computer linked or clustered with distributed functions.

For instance, at least one processor device and a memory may be used to implement the above described embodiments. A processor device may be a single processor, a plurality of processors, or combinations thereof. Processor devices may have one or more processor cores.

Various embodiments of the invention are described in terms of this example computer system 700. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 704 may be a single processor in a multi-core/multiprocessor system, such system operating alone, or in a cluster of computing devices operating in a cluster or server farm. Processor device 704 is connected to a communication infrastructure 706, for example, a bus, message queue, network or multi-core message-passing scheme.

Computer system 700 also includes a main memory 708, for example, random access memory (RAM), and may also include a secondary memory 710. Secondary memory 710 may include, for example, a hard disk drive 712, removable storage drive 714 and solid state drive 716. Removable storage drive 714 may include a floppy disk drive, a magnetic tape drive, an optical disk drive, a flash memory, or the like. The removable storage drive 714 reads from and/or writes to a removable storage unit 718 in a well known manner. Removable storage unit 718 may include a floppy disk, magnetic tape, optical disk, flash drive etc. which is read by and written to by removable storage drive 714. As will be appreciated by persons skilled in the relevant art, removable storage unit 718 includes a computer readable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such devices may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Communications interface 724 may include a modem, a network interface (such as an Ethernet card), a communications port, a PCMCIA slot and card, or the like. Software and data transferred via communications interface 724 may be in electronic, electromagnetic, optical, or other forms capable of being received by communications interface 724. This data may be provided to communications interface 724 via a communications path 726. Communications path 726 carries the data and may be implemented using wire or cable, fiber optics, a phone line, a cellular phone link, an RF link or other communications channels.

In this document, the terms "computer program storage medium" and "computer readable storage medium" are used to generally refer to storage media such as removable storage unit 718, removable storage unit 722, and a hard disk installed in hard disk drive 712. Computer program storage medium and computer readable storage medium may also refer to memories, such as main memory 708 and secondary memory 710, which may be memory semiconductors (for example, DRAMs, etc.).

Computer programs (also called computer control logic) may be stored in main memory 708 and/or secondary memory 710. Computer programs may also be received via communications interface 724 in non-storage capable signals. Such computer programs, when executed, enable computer system 700 to implement embodiments as discussed herein. In particular, the computer programs, when executed, enable processor device 704 to implement the processes of embodiments, such as the stages in the method illustrated by method 700 of FIG. 7 discussed above. Accordingly, such computer programs represent controllers of the computer system 700. Where embodiments are implemented using software, the software may be stored in a computer program product and loaded into computer system 700 using removable storage drive 714, interface 720, hard disk drive 712 or communications interface 724.

Embodiments of the invention also may be directed to computer program products comprising software stored on any computer readable storage medium. Such software, when executed in one or more data processing devices, causes a data processing device(s) to operate as described herein. Embodiments of the invention employ any computer useable or readable storage medium. Examples of computer readable storage mediums include, but are not limited to, primary storage devices (for example, any type of random access memory), and secondary storage devices (for example, hard drives, floppy disks, CD ROMS, ZIP disks, tapes, magnetic storage devices, and optical storage devices, MEMS, nanotechnological storage device, etc.).

Embodiments described herein relate to methods and apparatuses for managing pooled resources of VPN proxy servers. The summary and abstract sections may set forth one or more but not all example embodiments as contemplated by the inventors, and thus, are not intended to limit the present invention and the claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described example embodiments, but should be defined only in accordance with the claims and their equivalents.

What is claimed is:

1. A computer-implemented method for managing pooled virtual private network (VPN) proxy servers by a central server, comprising:
   receiving, at the central server, a registration request from a computing device to register with the central server as a VPN proxy server;
   registering the computing device as a VPN proxy server responsive to the registration request;
   maintaining a list of registered VPN proxy servers;
   receiving a connection request from a client for a VPN connection to a VPN proxy server; and
   facilitating, responsive to receiving the connection request, establishment of the VPN connection from the client to the computing device by:
      searching the list of registered VPN proxy servers for a result set of registered VPN proxy servers based on geograohic location information received by the central server from the client; and
      sending the result set of registered VPN proxy servers to the client, wherein the result set includes the computing device registered as a VPN proxy server.

2. The computer-implemented method of claim 1, further comprising:
   updating the list of registered VPN proxy servers by removing, from the list, a first VPN proxy server responsive to a determination that the first VPN proxy server is not reachable.

3. The computer-implemented method of claim 2, wherein the central server receives notification from the client that the first VPN proxy server is not reachable.

4. The computer-implemented method of claim 1, further comprising:
   encrypting the result set of registered VPN proxy servers prior to sending the result set to the client, wherein sending the result set of registered VPN proxy servers to the client comprises sending the encrypted result set.

5. The computer-implemented method of claim 1, wherein the registration request from the computing device includes an IP address, geographic location, and available bandwidth.

6. The computer-implemented method of claim 5, wherein the result set includes, for the computing device, the IP address, geographic location, and available bandwidth.

7. The computer-implemented method of claim 6, wherein the client stores the IP address, geographic location, and available bandwidth of the computing device.

8. The computer-implemented method of claim 1, wherein the VPN connection is to a wide area network.

9. The computer-implemented method of claim 1, wherein the VPN connection is to a private local area network (LAN).

10. The computer-implemented method of claim 1, further comprising establishing the VPN connection between the client device and the computing device registered as a VPN proxy server.

11. The computer-implemented method of claim 1, wherein the client device is a mobile phone.

12. The computer-implemented method of claim 1, wherein the VPN connection includes a wireless connection.

13. The computer-implemented method of claim 1, wherein the preferences received from the client includes a required minimum bandwidth available to the potential VPN proxy server.

14. A processor-based system for managing pooled virtual private network (VPN) proxy servers, comprising:
   one or more processors; at least one memory coupled to the one or more processors; wherein the one or more processors are configured to:
   process a registration request from a computing device to register as a VPN proxy server;
   register the computing device as a VPN proxy server responsive to the registration request;
   maintain a list of registered VPN proxy servers;
   receive a connection request from a client for a VPN connection to a VPN proxy server; and facilitate, responsive to receiving the connection request, establishment of the VPN connection from the client to the computing device by:
    searching the list of registered VPN proxy servers for a result set of registered VPN proxy servers based on geograohic location information received by the central server from the client; and
    sending the result set of registered VPN proxy servers to the client.

15. The system of claim 14, wherein the one or more processors are further configured to:
    update the list of registered VPN proxy servers by removing, from the list, a first VPN proxy server responsive to a determination that the first VPN proxy server is not reachable.

16. The system of claim 14, wherein the one or more processors are further configured to:
    encrypt the result set of registered VPN proxy servers prior to sending the result set to the client, wherein sending the result set of registered VPN proxy servers to the client comprises sending the encrypted result set.

17. The system of claim 14, wherein the one or more processors are configured in a load sharing configuration.

18. A computer-readable storage device having computer program logic recorded thereon, execution of which, by one or more computing processors, causes the computing processors to perform operations comprising:
    receiving, at the central server, a registration request from a computing device to register with the central server as a virtual private network (VPN) proxy server;
    registering the computing device as a VPN proxy server responsive to the registration request; maintaining a list of registered VPN proxy servers;
    receiving a connection request from a client for a VPN connection to a VPN proxy server; and
    facilitating, responsive to receiving the connection request, establishment of the VPN connection from the client to the computing device by:
        searching the list of registered VPN proxy servers for a result set of registered VPN proxy servers based on geograohic location information received by the central server from the client; and
        sending the result set of registered VPN proxy servers to the client, wherein the result set includes the computing device registered as a VPN proxy server.

19. The computer-readable storage device of claim 18, wherein the computer program logic recorded thereon, when executed, further causes the computing processors to perform operations comprising:
    updating the list of registered VPN proxy servers by removing, from the list, a first VPN proxy server responsive to a determination that the first VPN proxy server is not reachable.

20. The computer-readable storage device of claim 19, wherein the computer program logic recorded thereon, when executed, further causes the computing processors to perform operations comprising receiving notification from the client that the first VPN proxy server is not reachable.

21. The computer-readable storage device of claim 18, wherein the computer program logic recorded thereon, when executed, further causes the computing processors to perform operations comprising:
    encrypting the result set of registered VPN proxy servers prior to sending the result set to the client, wherein sending the result set of registered VPN proxy servers to the client comprises sending the encrypted result set.

22. The computer-readable storage device of claim 18, wherein the registration request from the computing device includes an IP address, geographic location, and available bandwidth.

23. The computer-readable storage device of claim 18, wherein the computer program logic recorded thereon, when executed, further causes the computing processors to perform operations comprising: receiving VPN proxy server preferences from the client and searching the list of registered VPN proxy servers for the result set of registered VPN proxy servers by searching for servers satisfying the preferences.

24. The computer-readable storage device of claim 23, wherein the preferences received from the client includes a required minimum bandwidth available to the potential VPN proxy server.

* * * * *